United States Patent
Chiu

(10) Patent No.: US 8,251,580 B2
(45) Date of Patent: *Aug. 28, 2012

(54) APPARATUS AND METHOD FOR PROTECTING OVERHEATED HARD DRIVE

(75) Inventor: Chia-Chang Chiu, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 913 days.

This patent is subject to a terminal disclaimer.

(21) Appl. No.: 12/266,507

(22) Filed: Nov. 6, 2008

(65) Prior Publication Data

US 2010/0110583 A1 May 6, 2010

(51) Int. Cl.
*G05B 11/01* (2006.01)
*G06F 15/177* (2006.01)
*G01K 1/08* (2006.01)

(52) U.S. Cl. ............ 374/141; 713/2; 713/300; 702/132

(58) Field of Classification Search ............. 374/141, 374/152; 713/2, 300; 702/132

See application file for complete search history.

(56) References Cited

U.S. PATENT DOCUMENTS

| | | | |
|---|---|---|---|
| 6,363,490 B1 * | 3/2002 | Senyk | 713/300 |
| 6,630,754 B1 * | 10/2003 | Pippin | 307/117 |
| 7,136,247 B2 | 11/2006 | Escobar et al. | |
| 7,194,646 B1 * | 3/2007 | Watts, Jr. | 713/322 |
| 7,454,631 B1 * | 11/2008 | Laudon et al. | 713/300 |
| 2005/0216221 A1 * | 9/2005 | Broyles et al. | 702/132 |
| 2007/0219644 A1 | 9/2007 | Sonobe | |
| 2010/0153698 A1 * | 6/2010 | Chiu | 713/2 |
| 2011/0131400 A1 * | 6/2011 | Chiu et al. | 713/2 |

FOREIGN PATENT DOCUMENTS

EP 1566722 A2 8/2005

* cited by examiner

*Primary Examiner* — Christopher Fulton

(74) *Attorney, Agent, or Firm* — Apex Juris, PLLC; Tracy M. Heims

(57) ABSTRACT

An apparatus and method are provided to monitor the current temperature of a hard drive in a computer system protect, and protect the hard drive from being overheated. The apparatus includes a thermal sensor and a data input/output module. The hard drive stores at least one application program. The thermal sensor senses a current temperature of the hard drive. When the thermal sensor senses that the current temperature of the hard drive ascends to a first preset temperature, the data input/output module ceases the hard drive from being accessed. When the thermal sensor senses that the current temperature of the hard drive descends to a second preset temperature, the data input/output module allows the hard drive to be accessed.

20 Claims, 3 Drawing Sheets

APPARATUS AND METHOD FOR PROTECTING OVERHEATED HARD DRIVE

BACKGROUND OF THE INVENTION

1. Field of the Invention

The present invention relates to an overheat protection mechanism, and more particularly, to an overheat protection apparatus and method for an internal hard drive of a computer system.

2. Related Art

Specific computer equipments and systems are required to operate under high-temperature or closed environments. When the temperature is rising, electrical components of the computer systems may be overheated, which causes malfunctioning or failures. Therefore, effective monitors and managements of heat are extremely significant for the computer systems that are operating under hot environments. Beside, many electrical systems are designated to be equipped with waterproof and dustproof functions; the housings and relevant structures have to be designed according to the usage requirements and the levels of Ingress Protection (IP) standards. Namely, these electrical systems are well-closed housings to have waterproof and dustproof functions; yet these waterproof and dustproof housings also limit the dissipation of the internal heats inside the electrical systems.

Take a ruggedized tablet PC as an example of a computer system. If the computer system is operating under an environmental temperature of 60° C., the actual temperature of its internal hard drive possibly reaches 85° C., which absolutely exceeds the standard operative temperature of the hard drive. In said situation, the computer system will consequently incur a crash, such as the generation of a "blue screen". If the user is still operating the computer system while it is overheated, the user's operation at the moment will cause data loss of the hard drive, or even cause damage of the hard drive.

SUMMARY OF THE INVENTION

To solve the aforesaid problems of the prior art, the present invention provides an overheat protection apparatus and method for an internal hard drive. The present invention prevents the hard drive from overheating and the consequent computer crash or data loss.

In an embodiment of the present invention, an apparatus is provided to protect an overheated hard drive in a computer system. The hard drive stores at least one software program. The apparatus includes a thermal sensor and a data input/output module. The thermal sensor senses a current temperature of the hard drive. And the data input/output module ceases the hard drive being accessed when the thermal sensor senses that the current temperature of the hard drive ascends to a first preset temperature. The data input/output module allows the hard drive being accessed when the thermal sensor senses that the current temperature of the hard drive descends to a second preset temperature.

In another embodiment of the present invention, a method is provided to protect an overheated hard drive in a computer system. The hard drive stores at least one software program. The method comprises the following steps. First of all, configure a thermal sensor on the hard drive to sense a current temperature of the hard drive. And then detect the current temperature of the hard drive, afterwards control a data input/output module to cease the hard drive from being accessed when the current temperature of the hard drive ascends to a first preset temperature, or control the data input/output module to allow the hard drive to be accessed when the current temperature of the hard drive descends to a second preset temperature.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
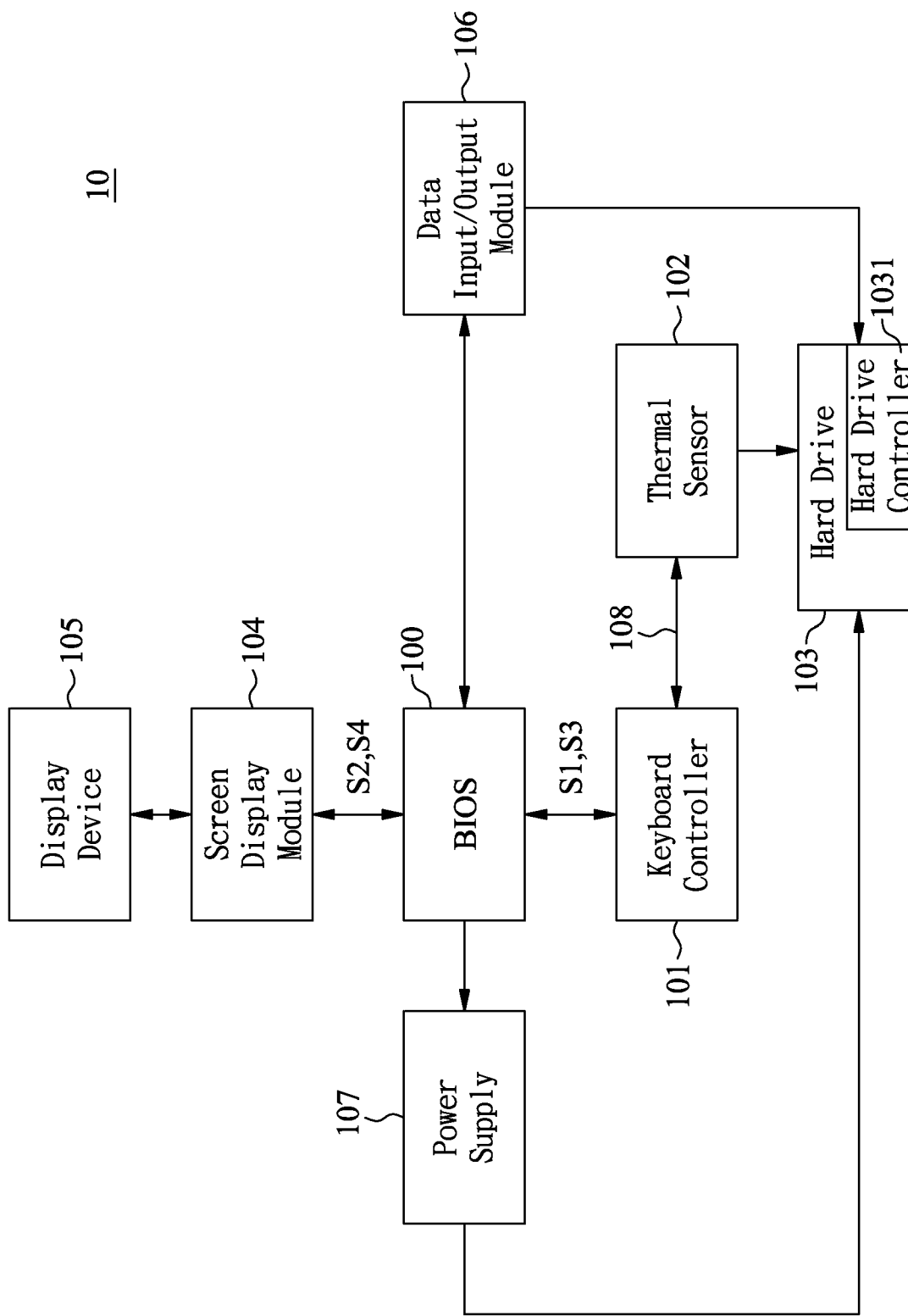
FIG. 1 is a block diagram of an apparatus for protecting an overheated hard drive according to an embodiment of the present invention.

Reference will now be made in detail to the present preferred embodiments of the invention, examples of which are illustrated in the accompanying drawings. Wherever possible, the same reference numbers are used in the drawings and the description refers to the same or the like parts.

FIG. 1 is a block diagram of an apparatus 10 for protecting an overheated hard drive according to an embodiment of the present invention. The hard drive 10 includes a BIOS (Basic Input/Output System) 100, a keyboard controller 101, a thermal sensor 102, a hard drive 103, a hard drive controller 1031, a screen display module 104, a display device 105, a data input/output module (Data I/O module) 106, a power supply 107 and a data transmission channel 108.

The hard drive 103 stores at lest one operating system and at least one application program. As well known to those skilled in the art, the operating system and the application program are operative to access data stored in the hard drive 103. The power supply 107 supplies electricity power to the hard drive 103. The BIOS 100 controls the power supply 107 to cease supplying electricity power to the hard drive 103, and return to supply electricity power to the hard drive 103. The thermal sensor 102 senses the current temperature of the hard drive 103. There are various ways to configure the thermal sensor 102. For example, the thermal sensor 102 may be pasted on the surface of the hard drive 103 to sense the current temperature of the hard drive 103. The keyboard controller 101 electrically connects with the thermal sensor 102 through the data transmission channel 108 to instantly detect the current temperature of the hard drive 103. The data transmission channel 108 may be realized by SM bus (System Management bus), while the keyboard controller 101 may be realized by an EC (Embedded Controller). The screen display module 104 includes an OSD (On-Screen Display) application program so as to control the display device 105 to display an overheat caution message, and to control the display device 105 to eliminate the overheat caution message. The data input/output module 106 allows the hard drive 103 to be accessed, and ceases the hard drive 103 from being accessed.

Figure 2A:
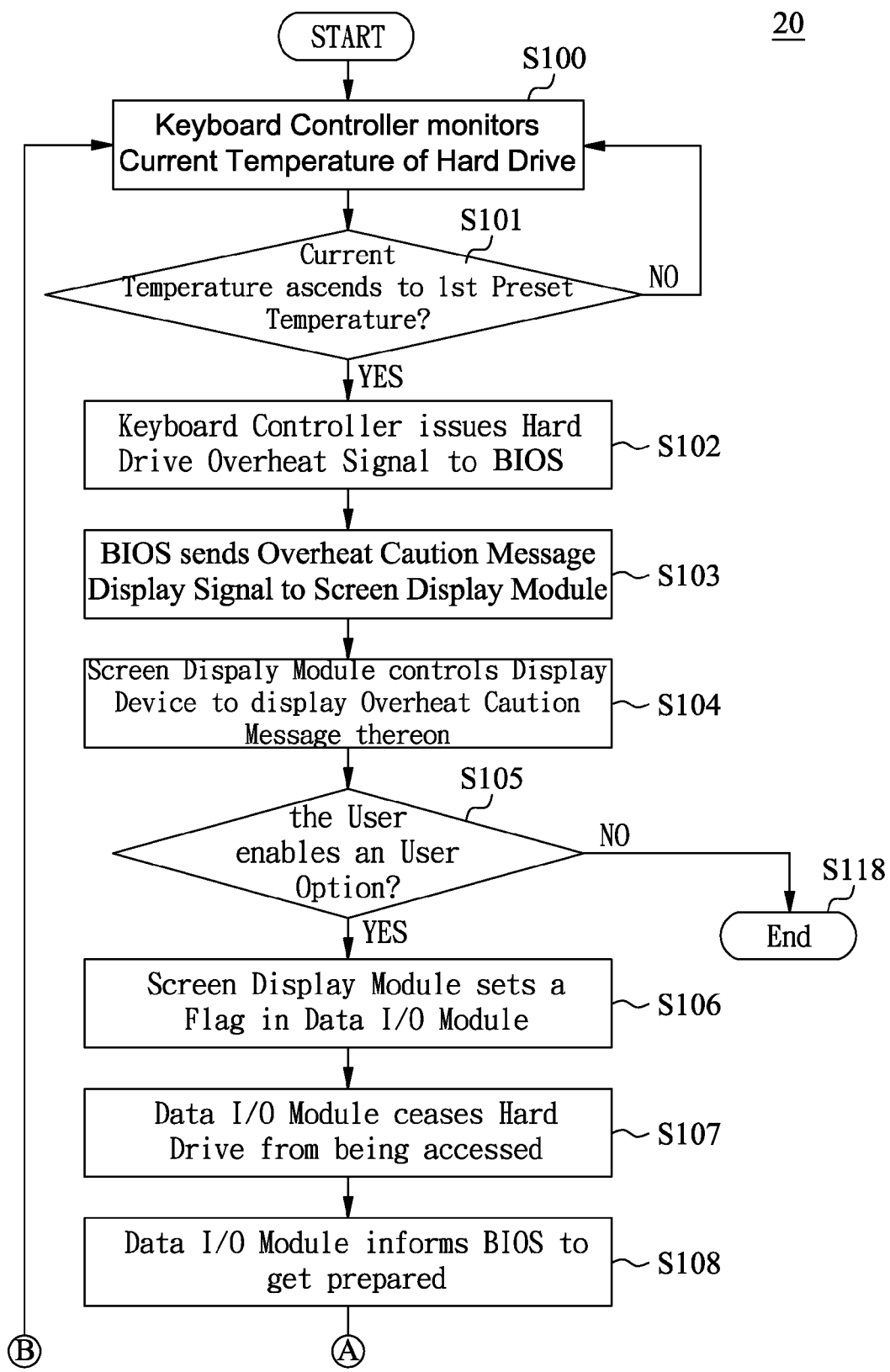
FIGS. 2A and 2B are operation flow charts of a method for protecting the overheated hard drive according to the embodiment of the present invention illustrated in FIG. 1.
Figure 2B:
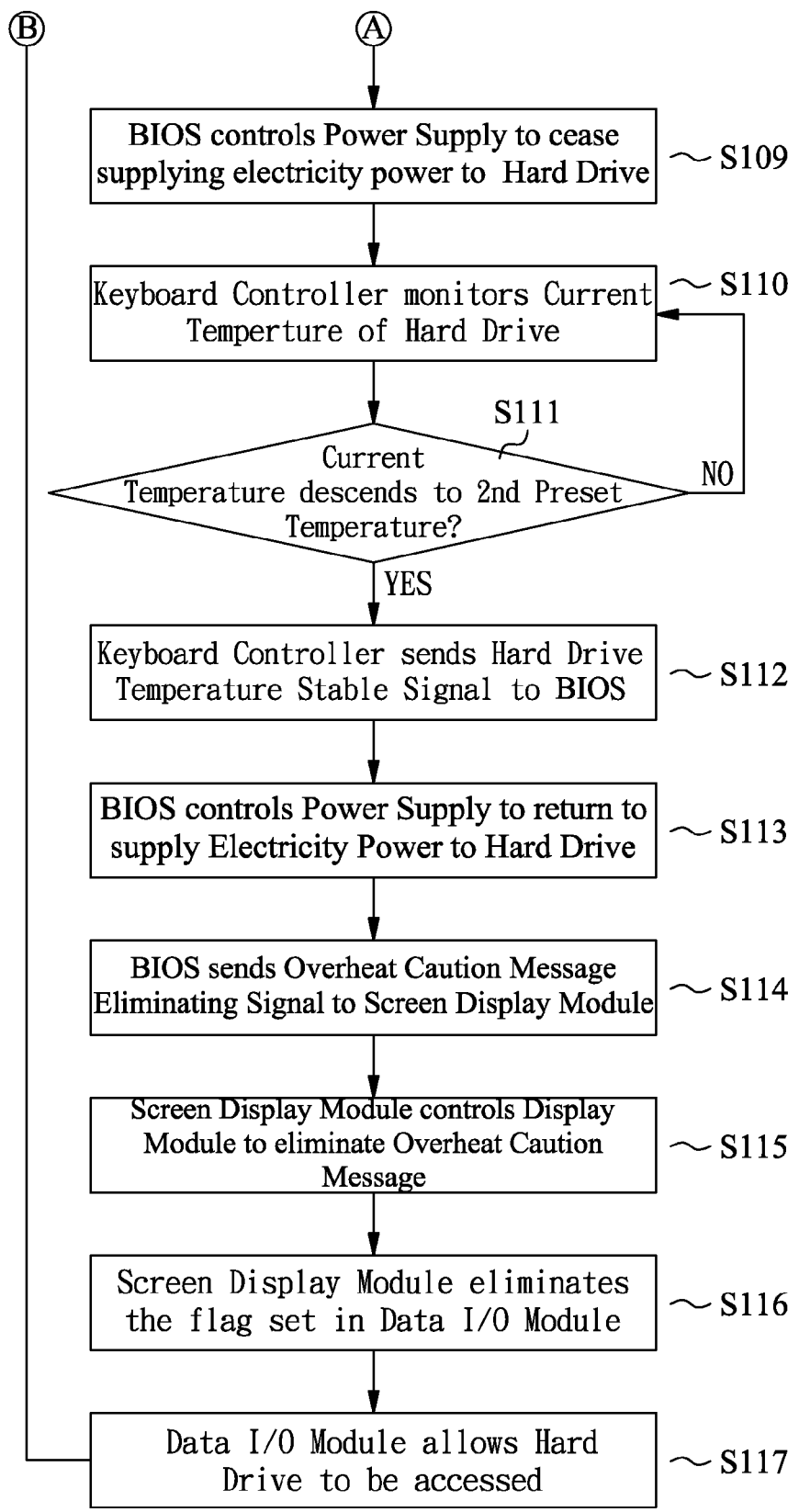

FIGS. 2A and 2B are operation flow charts of a method 20 for protecting the overheated hard drive according to the embodiment of the present invention illustrated in FIG. 1. In Step S100, the keyboard controller 101 monitors the current temperature of the hard drive 103. In Step S101, the keyboard controller 101 determines whether the current temperature of the hard drive 103 ascends to a first preset temperature, such as 85° C. If the current temperature of the hard drive 103 does not reach the first preset temperature, return to Step S100 and continue to monitor the current temperature of the hard drive 103. In Step S102, when the keyboard controller 101 detects that the current temperature of the hard drive 103 ascends to the first preset temperature, the keyboard controller 101 sends a hard drive overheat signal S1 to the BIOS 100, so as to inform the BIOS 100 that the current temperature of the hard drive 103 is too high; wherein the hard drive overheat signal S1 may be realized by an interrupt signal, such as a SCI (System Control Interrupt) event. In Step S103, after the BIOS 100 receives the hard drive overheat signal S1, the BIOS 100 sends an overheat caution message display signal S2 to the screen display module 104, so as to inform the screen display module 104 to control the display device 105 to display an overheat caution message; wherein the overheat caution message includes an user option so that the user can determine whether to enable the user option for taking a further action and avoid the hard drive from being overheated. The overheat caution message display signal S2 may be realized by a Notify event. In Step S104, according to the overheat caution message display signal S2, the screen display module 104 controls the display device 105 to display the overheat caution message and inform the user that the current temperature of the hard drive 103 is overheated. Moreover, in this Step S104 the screen display module 104 may also control the display device 105 to display relevant messages of a reminder so that the user is reminded to store current task contents and stages, thereby preventing the computer system from failing to store the current task contents resulted from the overheated hard drive. In Step S105, the computer system waits for whether the user determines to enable the user option. If the user determines not to enable the user option, no further protecting action will be applied to the overheated hard drive. Therefore the flow chart ends at Step S118. On the Contrary, if the user chooses to enable the user option, the flow chart will move to Step S106. In Step S106, the screen display module 104 sets a flag in the data input/output module 106. In Step S107, when the flag is set, the data input/output module 106 will cease the hard drive 103 from being accessed according the set flag. In Step S108, the data input/output module 106 informs the BIOS 100 to get prepared. Eventually, in Step S109, the BIOS 100 controls the power supply 107 to cease supplying electricity power to the hard drive 103.

What mentioned above is a solution aimed to the condition that the current temperature of the hard drive 103 is overheated. The hard drive 103 will have its current temperature lower while no electricity power is supplied to the hard drive 103. At least, the hard drive 103 will not have a rising temperature when the hard drive 103 is no longer operating. Meanwhile, the operating system and other application programs will still be operative in System RAM to perform other non-hard-disk tasks. That is, the overheated hard drive 103 will not cause the computer system to cease all the on-going tasks. In below sections, the present invention will discuss how to recover the hard drive 103 back to operation when the current temperature of the hard drive 103 descends to an acceptable range.

In Step S110, the keyboard controller 101 continues to detect the current temperature of the hard drive 103. In Step S111, the keyboard controller 101 determines whether the current temperature of the hard drive 103 descends to a second preset temperature, such as 75° C. If the current temperature of the hard drive 103 does not descend to the second preset temperature, return to Step S109 and continue to monitor the current temperature of the hard drive 103. In Step S112, when the keyboard controller 101 detects that the current temperature of the hard drive 103 descends to the second preset temperature, the keyboard controller 101 sends a hard drive temperature stable signal S3 to the BIOS 100 so as to inform the BIOS 100 that the current temperature of the hard drive 103 descends; wherein the hard drive temperature stable signal S3 may be realized by an interrupt signal, such as a SCI (System Control Interrupt) event. In Step S113, after the BIOS 100 receives the hard drive temperature stable signal S3, the BIOS 100 controls the power supply 107 to return to supply electricity power to the hard drive 103. When the hard drive 103 is recovered back with electricity power, in Step S114, the BIOS 100 sends an overheat caution message eliminating signal S4 to the screen display module 104, so as to inform the screen display module 104 to control the display device 105 for eliminating the overheat caution message; wherein the overheat caution message eliminating signal S4 may be realized by a Notify event. In Step S115, according to the overheat caution message eliminating signal S4, the screen display module 104 controls the display device 105 to eliminate the overheat caution message and inform the user that the current temperature of the hard drive 103 descends. In Step S116, when the display device 105 finishes eliminating the overheat caution message, the screen display module 104 eliminates the flag set in the data input/output module 106. In Step S117, when the flag is eliminated, the data input/output module 106 will allow the hard drive 103 to be accessed. After the hard drive 103 is recovered for data access, the flow chart returns to Step S100 and continues to monitor the current temperature of the hard drive 103.

It is to be noted that, although the above embodiments of the present invention discloses an approach to cease/return to supply electricity power to the hard drive 103 through the power supply 107, there are still other alternatives. The power supply 107 may constantly supply electricity power to the hard drive 103. Yet when the power supply 107 keeps supplying electricity power to the hard drive 103 and when the hard drive 103 is ceased to be accessed, a hard drive controller 1031 (as shown in FIG. 1) of the hard drive 103 will be used to directly interrupt/cease the operation of the hard drive 103, or to control/lower the rotation speed of the hard drive 103, or to recover/restart the access/operation of the hard drive 103 when allowed, or to increase the rotation speed of the hard drive 103.

Furthermore, although in the embodiments of the present invention there discloses two temperatures, the first preset temperature and the second preset temperature, the two temperatures may possibly equal to each other; namely, the first preset temperature equals to the second preset temperature. In other words, there is only one temperature threshold. In such situation, when the current temperature of the hard drive is higher or lower than the temperature threshold, the computer system will start to perform the relevant actions according to the embodiments of the present invention.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. An apparatus for protecting an overheated hard drive in a computer system, the hard drive storing at least one software program, the apparatus comprising:
   a thermal sensor, sensing a current temperature of the hard drive; and
   a data input/output module, ceasing the hard drive being accessed when the thermal sensor senses that the current temperature of the hard drive ascends to a first preset temperature, the data input/output module allowing the hard drive being accessed when the thermal sensor senses that the current temperature of the hard drive descends to a second preset temperature,
   wherein the non-hard drive functions of the computer system are operative even when the hard drive is not operative.

2. The apparatus as claimed in claim 1 further comprising a power supply, wherein the power supply ceases supplying electricity power to the hard drive when the hard drive is ceased to be accessed, the power supply supplying electricity power to the hard drive when the hard drive is allowed to be accessed.

3. The apparatus as claimed in claim 2 further comprising:
   a basic input/output system (BIOS) controlling the power supply to cease supplying power electricity to the hard drive according to a hard drive overheat signal, the BIOS controlling the power supply to supply power electricity to the hard drive according to a hard drive temperature stable signal; and
   a keyboard controller, electrically connecting to the thermal sensor and detecting the current temperature of the hard drive through the thermal sensor, wherein the keyboard controller sends the hard drive overheat signal when the keyboard controller detects that the current temperature of the hard drive ascends to the first preset temperature, the keyboard controller sending the hard drive temperature stable signal when the keyboard controller detects that the current temperature of the hard drive descends to the second preset temperature.

4. The apparatus as claimed in claim 3, wherein the BIOS sends a overheat caution message display signal according to the hard drive overheat signal, and the BIOS sends a overheat caution message eliminating signal according to the hard drive temperature stable signal.

5. The apparatus as claimed in claim 4 further comprising:
   a display device, displaying an overheat caution message; and
   a screen display module, controlling the display device to display the overheat caution message according to the overheat caution message display signal, and the screen display module controlling the display device to eliminate the overheat caution message according to the caution message eliminating signal.

6. The apparatus as claimed in claim 5, wherein the data input/output module includes a flag, the data input/output module ceasing the hard drive from being accessed when the flag is set, the data input/output module allowing the hard drive to be accessed when the set flag is eliminated.

7. The apparatus as claimed in claim 6, wherein the screen display module sets the flag according to the overheat caution message display signal, and the screen display module eliminates the flag according to the overheat caution message eliminating signal.

8. The apparatus as claimed in claim 5, wherein the overheat caution message includes a user option, and when the user option is enabled, the data input/output module ceasing the hard drive from being accessed according to the enabled user option.

9. The apparatus as claimed in claim 1 further comprising a hard drive controller, wherein the hard drive controller interrupts/ceases the operation of the hard drive when the hard drive is ceased to be accessed, the hard drive controller recovering/restarting the operation of the hard drive when the hard drive is allowed to be accessed.

10. The apparatus as claimed in claim 1 further comprising a hard drive controller, wherein the hard drive controller decreases rotation speed of the hard drive when the hard drive is ceased to be accessed, the hard drive controller increasing the rotation speed of the hard drive when the hard drive is allowed to be accessed.

11. The apparatus as claimed in claim 1, wherein the first preset temperature is greater than the second preset temperature.

12. The apparatus as claimed in claim 1, wherein the first preset temperature equals to the second preset temperature.

13. A method for protecting an overheated hard drive in a computer system, the hard drive storing at least one software program, the method comprising:
   configuring a thermal sensor on the hard drive to sense a current temperature of the hard drive; and
   detecting the current temperature of the hard drive, and controlling a data input/output module to cease the hard drive from being accessed when the current temperature of the hard drive ascends to a first preset temperature, and controlling the data input/output module to allow the hard drive to be accessed when the current temperature of the hard drive descends to a second preset temperature,
   wherein the non-hard drive functions of the computer system are operative even when the hard drive is not operative.

14. The method as claimed in claim 13 further comprising ceasing supplying electricity power to the hard drive when the hard drive is ceased to be accessed, and allowing to supply electricity power to the hard drive when the hard drive is allowed to be accessed.

15. The method as claimed in claim 13 further comprising interrupting/ceasing the operation of the hard drive when the hard drive is ceased to be accessed, and recovering/restarting the operation of the hard drive when the hard drive is allowed to be accessed.

16. The method as claimed in claim 13 further comprising decreasing rotation speed of the hard drive when the hard drive is ceased to be accessed, and increasing the rotation speed of the hard drive when the hard drive is allowed to be accessed.

17. The method as claimed in claim 13 further comprising displaying a overheat caution message on a display device when the current temperature of the hard drive ascends to the first preset temperature, and eliminating the overheat caution message displayed on the display device when the current temperature of the hard drive descends to the second preset temperature.

18. The method as claimed in claim 17, wherein the overheat caution message includes an user option, and when the user option is enabled, the data input/output module ceasing the hard drive from being accessed according to the enabled user option.

19. The method as claimed in claim 13, wherein the first preset temperature is greater than the second preset temperature.

20. The method as claimed in claim 13, wherein the first preset temperature equals to the second preset temperature.

* * * * *